(12) United States Patent
Sadagopan et al.

(10) Patent No.: US 7,860,870 B2
(45) Date of Patent: Dec. 28, 2010

(54) DETECTION OF ABNORMAL USER CLICK ACTIVITY IN A SEARCH RESULTS PAGE

(75) Inventors: Narayanan Sadagopan, Fremont, CA (US); Jie Li, Stanford, CA (US)

(73) Assignee: Yahoo! Inc., Sunnyvale, CA (US)

( * ) Notice: Subject to any disclaimer, the term of this patent is extended or adjusted under 35 U.S.C. 154(b) by 381 days.

(21) Appl. No.: 11/755,972

(22) Filed: May 31, 2007

(65) Prior Publication Data

US 2008/0301090 A1    Dec. 4, 2008

(51) Int. Cl.
    *G06F 17/30* (2006.01)
(52) U.S. Cl. .................................. 707/748; 707/758
(58) Field of Classification Search ................ 707/1–7, 707/10, 100–102
    See application file for complete search history.

(56) References Cited

U.S. PATENT DOCUMENTS

| 7,130,819 | B2 * | 10/2006 | Wang et al. ................... 705/26 |
| 7,318,056 | B2 * | 1/2008 | Taniguchi et al. ............ 709/219 |
| 7,577,641 | B2 * | 8/2009 | Koch et al. ......................... 1/1 |
| 7,634,472 | B2 * | 12/2009 | Thrall ............................... 1/1 |
| 7,693,902 | B2 * | 4/2010 | Kim et al. .................... 707/731 |
| 2003/0101451 | A1 * | 5/2003 | Bentolila et al. ............. 725/34 |
| 2005/0071255 | A1 * | 3/2005 | Wang et al. .................... 705/27 |
| 2007/0005588 | A1 * | 1/2007 | Zhang et al. .................... 707/5 |
| 2007/0073579 | A1 * | 3/2007 | Immorlica et al. ............ 705/14 |
| 2007/0255821 | A1 * | 11/2007 | Ge et al. ..................... 709/224 |
| 2008/0162475 | A1 * | 7/2008 | Meggs et al. .................... 707/6 |
| 2008/0270154 | A1 * | 10/2008 | Klots et al. ..................... 705/1 |

\* cited by examiner

*Primary Examiner*—Debbie Le
(74) *Attorney, Agent, or Firm*—Seth H Ostrow; Ostrow Kaufman LLP

(57) ABSTRACT

The present invention provides for the detection of abnormal user behavior for a query session of an electronic search engine. A query session is initiated upon receipt of a user search request that includes one or more search terms. The search engine, in accordance with known search technology, generates a search results page that includes various hyperlinks, including for example web content hyperlinks, page navigation hyperlinks and advertising hyperlinks. Tracking user activities generates the clickstream associated with the search results page. The present invention determines a probability score for the clickstream and then this score is normalized. A comparison of the normalized probability score with other normalized probability scores for similar query sessions determines of the normalcy of the query session.

8 Claims, 4 Drawing Sheets

| Bcookie | time | event | query_term | page # | section | position | slk | clickurl |
|---|---|---|---|---|---|---|---|---|
| 2a6tfgp26erhc | 0 | p | grand canyon | 1 | ov-top | 2 | title | page.co.uk |
| 2a6tfgp26erhc | 34 | p | grand canyon | 2 | ov-top | 2 | title | page.co.uk |
| 2a6tfgp26erhc | 53 | p | grand canyon | 3 | ov-top | 2 | title | page.co.uk |
| 2a6tfgp26erhc | 72 | p | grand canyon | 4 | ov-top | 2 | title | page.co.uk |
| 2a6tfgp26erhc | 91 | p | grand canyon | 5 | ov-top | 2 | title | page.co.uk |
| 2a6tfgp26erhc | 114 | p | grand canyon | 6 | ov-top | 2 | title | page.co.uk |
| 2a6tfgp26erhc | 134 | p | grand canyon | 7 | ov-top | 2 | title | page.co.uk |
| 2a6tfgp26erhc | 141 | p | grand canyon | 7 | ov-top | 2 | title | page.co.uk |
| 2a6tfgp26erhc | 161 | p | grand canyon | 8 | ov-top | 2 | title | page.co.uk |
| 2a6tfgp26erhc | 181 | p | grand canyon | 9 | ov-top | 2 | title | page.co.uk |

| Bcookie | time | event | query_term | page # | section | position | slk | Clickurl |
|---|---|---|---|---|---|---|---|---|
| 0097nkt269kl3 | 0 | c | grand canyon | 1 | sr | 1 | title | www.homepage.com/grand_canyon.htm |
| 0097nkt269kl3 | 106 | c | grand canyon | 1 | sr | 2 | cached | |
| 0097nkt269kl3 | 461 | c | grand canyon | 1 | sr | 3 | cached | |
| 0097nkt269kl3 | 486 | c | grand canyon | 1 | sr | 3 | title | www.cnn.com/canyon.htm |
| 0097nkt269kl3 | 660 | c | grand canyon | 1 | rel | 1 | text | |
| 0097nkt269kl3 | 970 | c | grand canyon | 1 | sr | 9 | title | members.tripod.com/~glf |
| 0097nkt269kl3 | 1031 | c | grand canyon | 1 | sr | 6 | title | www.armright.net/modules |
| 0097nkt269kl3 | 1669 | c | grand canyon | 1 | pagination | | next | |
| 0097nkt269kl3 | 1671 | p | grand canyon | 2 | ov-top | | | |

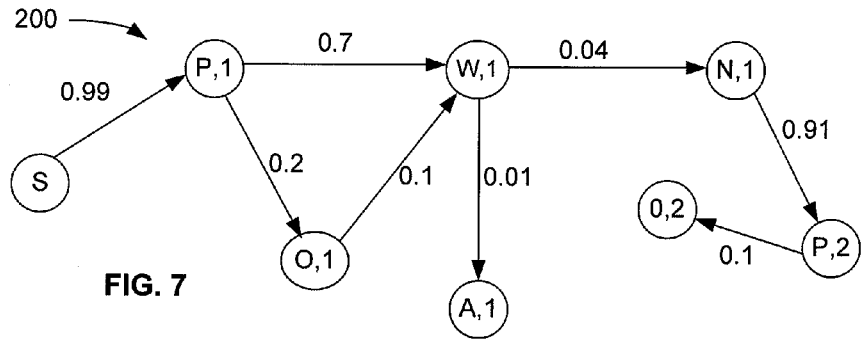

FIG. 7

DETECTION OF ABNORMAL USER CLICK ACTIVITY IN A SEARCH RESULTS PAGE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to search result user tracking technology and more specifically to determining abnormal user activity by analyzing user activity clickstreams on a search results page.

BACKGROUND OF THE INVENTION

Basic web-based content searching techniques are well known. Advancements in these systems include refinements on the produced search results, including tracking user activity relating to a search results page ("SERP"). It is important to track user activity for a variety of reasons, including monitoring the integrity of the search engine in detecting possible spam or automated robotic computing systems (e.g., "bots"). Monitoring activity can also generate beneficial results in helping to optimize search results on the SERP. But it can be difficult to detect normal user activity from erratic or abnormal activity, where the abnormal activity has a high probability of being related to some level of improper usage of the search technology. By way of example, if an advertiser pays for advertising on a per-click basis, it can be very important to determine when someone fraudulently clicks on a hyperlink, thereby improperly increasing the advertising costs for the advertiser.

One basic technique for detecting click fraud is to simply monitor user activity and visually attempt to detect if the click activity appears consistent with what would be considered a normal user session. For example, suppose a user is repeatedly clicking on an advertising link without ever clicking on any of the search result links, this may be indicative of click fraud where one party is attempting to increase the number of clicks for a particular link, and thereby potentially increasing advertising costs for the person or company that sponsoring such link. This click-fraud detection technique is not feasible on large-scale applications due to the sheer volume of clickstreams in most search engines.

Another problem occurs in determining those states constitute normal user behavior. Clickstream activity can be affected by a wide variety of factors, not the least of which are user demographics, Internet familiarity and interests of search technology users. This further complicates any user-based attempts to manually determine if clickstream data is normal.

The growth of web bots makes this detection even more important. Data mining can be a valuable resource for optimizing search engine technology and the activity of web bots obscures these data mining operations. More specifically, the search engine seeks to optimize operations based on user behavior, and these behaviors are thus obfuscated by the clickstream activity of web bots masquerading as users. The web bots also occupy significant bandwidth and computing resources, further reducing search engine optimization.

As such, there exists a need to determine normal user click behavior from abnormal activity. This determination can allow a search engine to detect fraudulent behavior, determine webbot activity and further optimize the search engine by allowing for the analysis of user click activity without abnormal click activity in the clickstream samples.

SUMMARY OF THE INVENTION

Generally, the present invention provides for the detection of abnormal user behavior for a query session of an electronic search engine. A query session is initiated upon receipt of a user search request that includes one or more search terms. The search engine, in accordance with any number and combination of known search technologies, generates a search results page that includes various hyperlinks, including for example web content hyperlinks, page navigation hyperlinks and advertising hyperlinks. Tracking user activity with the search results page forms the basis of the clickstream data for a given user.

Embodiments of the present invention may also comprise determining a conformance score for a given clickstream session and determining a normalized conformance score for the session, which may comprise normalizing the conformance score relative to the number of events in the clickstream session. The conformance score may be combined with other clickstream characteristics to form a multidimensional model for a given session. A comparison may then be made between the probability of the session's clickstream characteristics and probability scores for other query sessions, thereby determining if the clickstream is abnormal on the basis of the comparison.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 3 illustrates a sample screen shot of a search results page according to one embodiment of the present invention;

FIGS. 4 through 6 illustrate sample clickstreams including user clicking activity logs according to one embodiment of the present invention;

FIG. 7 illustrates a sample Markov chain of clickstream data according to one embodiment of the present invention.

DETAILED DESCRIPTION OF THE INVENTION

In the following description of the embodiments of the invention, reference is made to the accompanying drawings that form a part hereof, and in which is shown by way of illustration exemplary embodiments in which the invention may be practiced. It is to be understood that other embodiments may be utilized and structural changes may be made without departing from the scope of the present invention.

Figure 1:
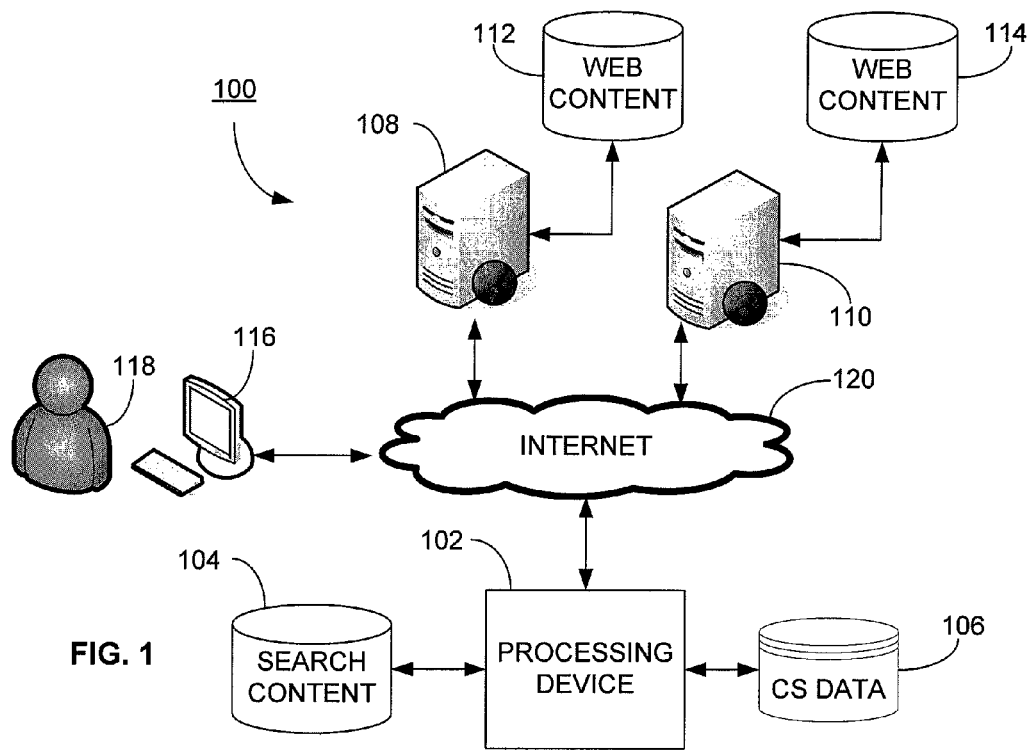
FIG. 1 illustrates a block diagram of a computing system including one embodiment of an apparatus for detecting abnormal user behavior using clickstream data.

FIG. 1 illustrates a system 100 that includes a processing device 102, a search content database 104 and a clickstream database 106. The system 100 also includes servers 108 and 110, a given server including a Web content database, 112 and 114, respectively. The system 100 further includes a user computer 116, operated by a user 118, in communication across a network, e.g., the Internet 120.

The search engine processing device 102 may be one or more processing elements operative to perform processing operations in response to executable instructions, collectively as a single element or as various processing modules in the embodiment described below with reference to FIG. 2. The search content database 104 and the clickstream database 106 may be one or more data storage devices of any suitable type, operative to store corresponding data therein. The network servers 108 and 110 may be associated with one or more Internet-accessible locations, such as websites having Internet-accessible information stored in the web content databases 112 and 114. The servers 108, 110 and content databases 112, 114 may represent well known Internet content systems whereby the user computer 116 enters a Universal Resource Locator (URL) and is directed, through routing protocols across the Internet 120, for retrieval of the web content therefrom, and subsequent display on the computing device 116.

It is recognized that many elements relating to the known operations of the system 100 have been omitted for clarity purposes only. Additionally, it is recognized that other types of processing elements may seek access to the processing device 102, which operates search engine technology thereon. For example, an automated processing device (e.g. a webbot) may seek access to the processing device 102.

The search engine processing device 102 is operative to receive user search requests, where each search request initiates a query session. As used herein, a query session refers to the processing operations of the processing device 102 and the user 118 activities through the computing device 116 relating to the search based on the received search term. The query session may be an extended session where a user scrolls through numerous pages of search results, clicking on any number of different types of hyperlinks. And by contrast, the query session may be a very short session where a user selects a single link or even fails to select any links and requests a new search. For clarification, as used herein, when a user uses a different search term, this defines a new query session, so for example a first search using the query term "car" would be a first query session and a second search using the query term "car parts" would be a second query session.

In standard search engine technology operations, the search engine processing device 102 receives a search request via the Internet 120 from the user 118, accesses the search content database 104 and generates a search results page. It is recognized that the processing device 102 may access any other suitable database (not shown) or other processing device or system for further refining the search results or supplementing the search results page with additional information, such as advertising information.

Figures 3, 4:
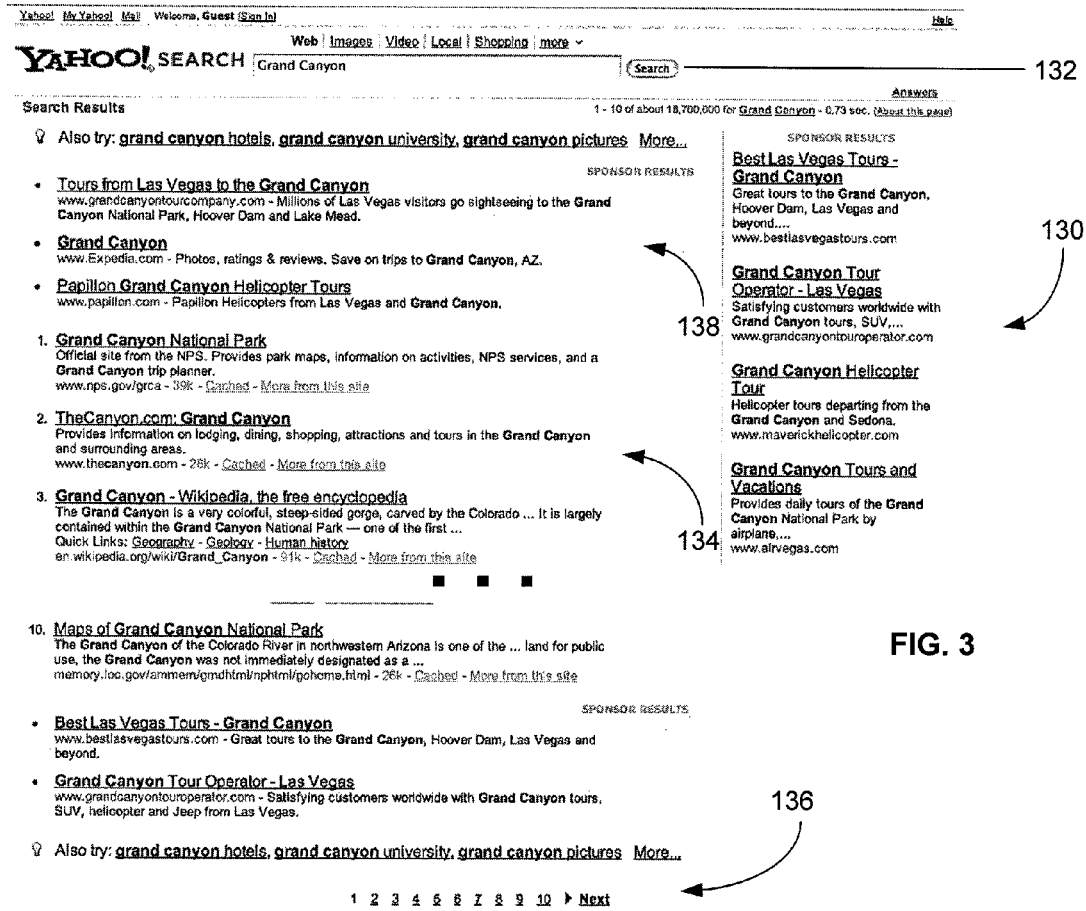

FIG. 3 illustrates an example of a search results page 130 for the search term Grand Canyon 132. This sample search results page 130 includes web content hyperlinks 134, page navigation hyperlinks 136 and advertising hyperlinks 138. In this sample screenshot, the search results page 130 also includes additional query term suggestions 140 for additional query sessions.

Referring back to FIG. 1, the search engine processing device 102 is operative to provide the search results page to the user computer 116 via the Internet 120 using standard routing techniques. The user 118 may thereupon review the search results page and click on any number of selectable hyperlinks.

The search engine processing device 102 is operative to track user click activities to determine clickstream data. As described in further detail below, the clickstream may include any number of user selections that can be analyzed to determine the activities performed based on the search results page. The clickstream may be determined by routing user selections through the searching engine processing device 102, including URL-based identifiers in the hyperlinks, installing local monitoring software on the computer 116 or any other suitable technique as recognized by one having ordinary skill in the art.

Through the search engine processing device 102, the clickstream acquired for the query session is stored in the clickstream database 106. The process of acquiring clickstream data may be repeated for numerous query sessions, where the clickstream data is stored in reference to the search term of the query session. Therefore, it is conceivable that the database 106 may store large amounts of clickstream data for any number of different query sessions and grouping together or otherwise referencing clickstream data for query sessions having a common search term.

Figure 2:
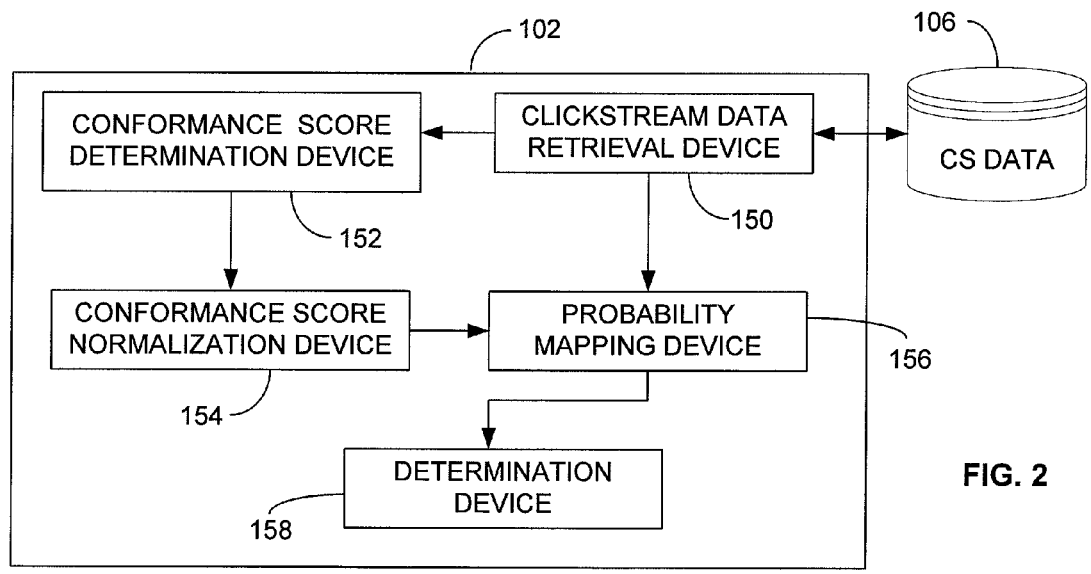
FIG. 2 illustrates a block diagram of another embodiment of an apparatus for detecting abnormal user behavior using clickstream data.

Using the clickstream data, the search engine processing device 102 may thereupon detect abnormal user behavior using, in one embodiment, the processing elements illustrated in FIG. 2. The processing device 102 may include a clickstream data retrieval device 150, a conformance score determination device 152, a conformance score normalization device 154, a probability mapping device 156 and a determine device 158. These devices may be implemented as stand-alone processing components, processing modules implemented in software or combined within a larger processing system or software application. It is further recognized that additional processing elements within the search engine processing device 102 relating to the generation of the search results pages have been omitted for clarity purposes only.

In one embodiment, the processing device 102 seeks to detect abnormal user behavior for a query session. This detection may be done on a post-session analysis by reviewing clickstream data for a completed query session utilizing a full set of clickstreams to establish the normal parameters for recognizing abnormal activity. The clickstream data retrieval device 150 may retrieve one or more clickstreams for analysis. As noted above, clickstreams are recorded records of user click activities relative to the search results page. FIGS. 4-6 illustrate three sample clickstreams, as recorded. FIGS. 4-6 illustrate the clickstream in a table format for ease of understanding, but it is understood that the clickstream data may be in any suitable format usable by the processing device 102.

The sample clickstream data 170 of FIG. 4 includes the data fields of Bcookie 172, time 174, event 176, query term 178, page number 180, section identifier 182, a position indicator 184, a selected link field 186 and a selected URL 188. It is recognized that not all data entry fields may have data stored therein. In this exemplary table 170, the Bcookie is a unique identifier referring to the particular query session, the time 174 indicates a time in the sequence of events that a recorded event occurs, the event field 176 indicates a type of event, the query term 178 indicates the query term for the query session, the page number 180 indicates which page of the search results page, as it is typical to have more then one page of search results, the section indicator 182 indicates in which section of the search results page the selection occurred, the position 184 indicates a position within the section, SLK 186 indicates the type of selected link and clickurl 188, where applicable, indicates the selected URL. In one example, the click event 176 may use nomenclature of a "c" to represent a web click, a "p" to represent a page request, an "o" represents a sponsored click, and an "n" represents next click to the next page in the SERP.

The clickstream data 170 indicates that the user clicked on the same link approximately 13 times in a total of 15 time intervals.

The clickstream data 190 of FIG. 5 includes similar clickstream data fields as the data 170 of FIG. 4. This table indicates a query session based on the query term "Grand Canyon" where the user selected the same URL, all on different pages, as a wide variety of different times.

The clickstream data 192 of FIG. 6 includes similar clickstream data fields at the data 170 and 190 of FIGS. 4 and 5. In this clickstream data, the user selected a variety of different URLs on different pages and at different times.

Referring back to FIG. 2, the clickstream data retrieval device 150 retrieves the clickstream data, such as for example the data 170 of FIG. 4. The device 150 thereupon provides this retrieved data to the conformance score determination device 152. This device 152 thereupon determines a conformance score for the clickstream. In one embodiment, the device 152 generates the conformance score based on a comparison against a Markov chain, which may be generated based on computational analysis of a set of clickstreams.

FIG. 7 illustrates a sample Markov chain 200. The Markov chain is computed by the sequence of event-locality pairs, in other words the probability between next activities in the chain itself. The Markov chain assumes that within a session, the next event is most impacted by the previous event. The transition probability values may be determined based on the clickstream set data by the analysis of the different clickstreams, for example the probability that a user clicked one link versus another. The clickstream data set allows for a generalized Markov chain to be generated specific to the search term and thus usable as the basis for the probability score. Stated another way, if a Markov chain is not already generated, a first pass over the clickstream data set generates the Markov chain and a second pass over the clickstream data generates the conformance score, also referred to as the conformance score, as described for example below.

In the sample Markov chain 200 of FIG. 7, each transition is given a probability. For example, the probability between the start of the session (S) and the first page request (P,1) is very high, approximately 99 percent. From there, the probability between the first page request (P,1) to the first web click (W,1) is approximately 70 percent and to the first sponsored click (0,1) is approximately 20 percent. Thus, continuing this process, the sequence of events may be calculated as a likelihood score. For example, the likelihood score φ can be determined by Equation 1:

$$\phi = Pr((P,1)|S) \times Pr((W,1)|(P,1)) \times Pr((N,1)|(W,1)) \times Pr((P,2)|(N,1)) \times Pr((O,2)|(P,2))$$

Equation 1:

Based on the exemplary probabilities listed in FIG. 7, the probability for the chain 200 is 0.00252, as the product of 0.99×0.7×0.04×0.91×0.1.

Although, it is recognized that as the probability is based on the product of sequence probabilities, the longer the chain the lower the score. Therefore, an additional step is to normalize the score by the number of transitions to obtain the average Markovian Loglikelihood, (MLHavg), such as performed by the probability score normalization device 154 of FIG. 2. In this example, the MLHavg may be computed as the natural log of 0.00252 (ln 0.00252) divided by the number of transitions, which in this example is five, giving the normalized conformance score of −1.2.

In another embodiment, not specifically illustrated in FIG. 2, the processing device 102 may determine a probability score based on the Mahanalobis distance according to Equation 2:

$$d(Q) = (x-\mu)\Sigma(x-\mu)^T$$

Equation 2:

where x is the normalized vector of events in the clickstream plus the conformance score MLHavg, u is the mean vector across all Q sessions and the summation represents the covariance matrix for variables in the vector.

The probability score generates a probability number that can be used to detect abnormal user behavior. But this probability score needs to be placed in context, therefore a comparing device 156 examines the probability score relative to the other query sessions. Again, this may include information retrieved by the clickstream data retrieval device 150 from clickstream data database 106.

The comparison may include determining if the query session probability score falls within or outside of a range. For example, if the probability score is very low and outside of a normal range, this may indicate abnormal user click activity. Similarly, a probability score within a normal range or having very high score may indicate normal or typical user activity.

In one embodiment, the comparison may include univariate or multivariate comparison models. An embodiment of a univariate outlier detector model is to mark the tail a certain percentage of the MLH distribution as abnormal and the remaining percentage as typical. An embodiment of a multivariate outlier detection model may include using some key clickstream characteristics including the MLHavg term. Each user session may be mapped to a Mahanalobis distance, which is directly related to the probability of the sessions' clickstream characteristics. The multivariate outlier detection scheme may include using specific click activity details, such as web click percentages of the event count, advertising click percentages of the event count and pageview percentages as a percentage of the event count, among other click activities.

Therefore, within the processing device 148, the comparing device 156 may coordinate with the determination device 158 to provide an indication of abnormal behavior. It is recognized that elements 156 and 158 may be incorporated into a single processing unit or software module to perform the noted functionality as a single operation. Additionally, the determination device 158 may include other security or follow-up procedures for the computing system. For example, the determination device may simply flag suspicious user activity logs for system administrator review, may notify an administrator or security personal or instigate other corrective measures.

By way of example, the processing device 148 may conduct the above-described process on the clickstreams 170, 190 and 192 of FIGS. 4-6. This analysis may flag the clickstreams 170 and 190 as suspicious because clickstream 170 shows repeated user clicks on the same section 182, in the same position 184 and clicking through the same URL 188 in almost sequential time frames 174. This clickstream may represent click fraud where a user or bot repeatedly selects an advertising link, thus fraudulently increasing advertising costs for a party that pays for advertising on a per-click basis. While not definitive proof of click fraud, this clickstream can, based on the comparison with related query sessions, by designated as suspicious for additional examination.

Similarly, the clickstream 190 of FIG. 5 illustrates another anomaly, specifically where the page number changes at different times without any clicks. This may be indicative of bot-based activities, or at the very least, indicative of click activity warranting additional examination. By comparison, the clickstream 192 of FIG. 6 illustrates a very sporadic log of click activity. Based on probability scores, this clickstream is most likely indicative a standard user behavior and would not be noted as being abnormal.

Figure 8:
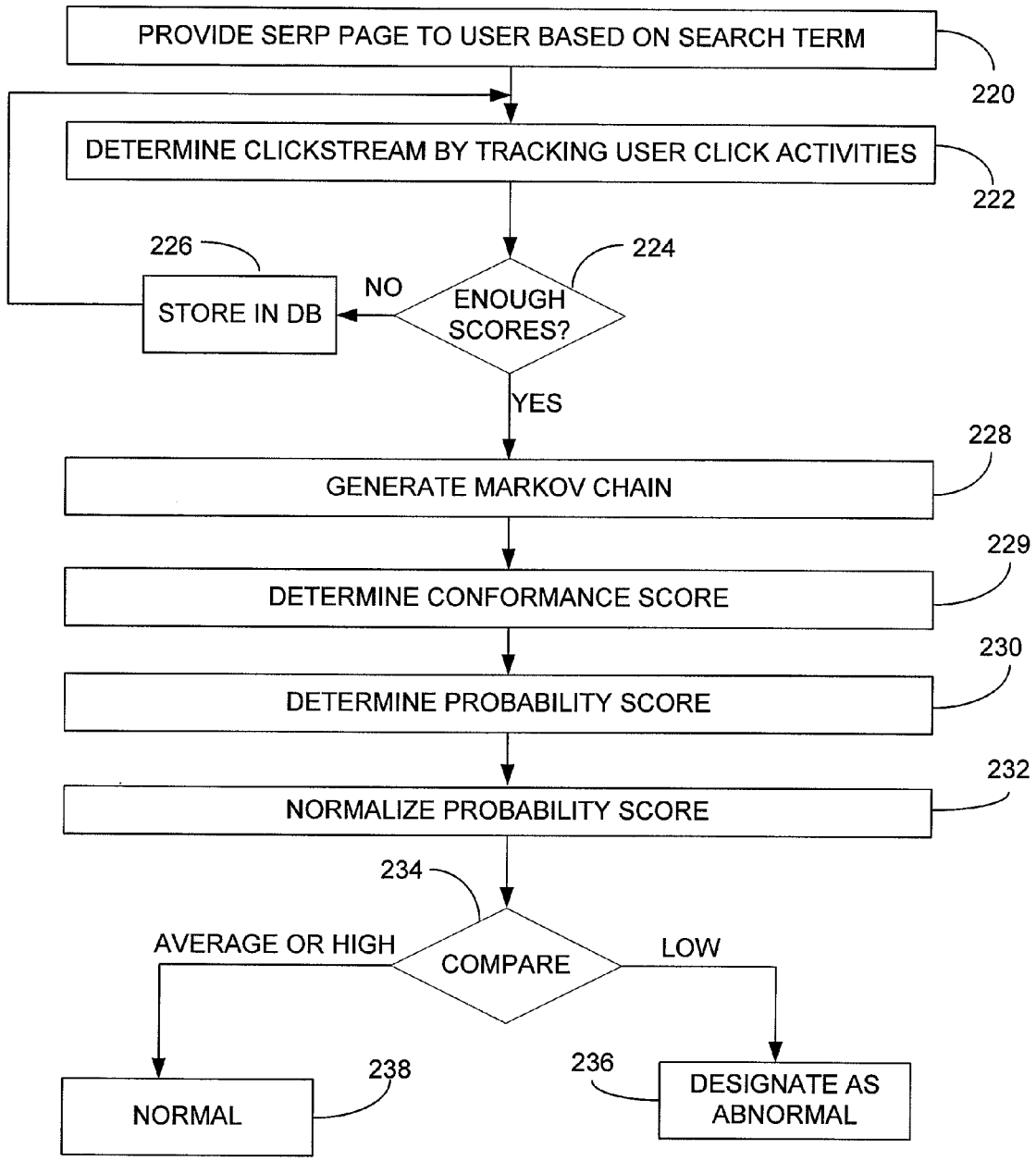
FIG. 8 illustrates a flow chart of the steps of one embodiment of a method for detecting abnormal user behavior using clickstream data.

For further illustration, FIG. 8 illustrates a flowchart of the steps of one embodiment of a method for detecting abnormal user behavior for a query session of an electronic search engine. The first step, 220 is to provide a search engine results page to the user based on the search term. The method further includes, step 222, determining the clickstream by tracking user activity, such as using one more of the above-described techniques. From this user activity, the method includes, step 224, determining if there are enough scores for effectively conducting the normalization and comparison techniques. If no, step 226 is to store the clickstream data in a database. Whereupon, the method reverts back to collecting additional clickstream data sets until the inquiry of step 224 is in the affirmative.

Step 228 is to generate a Markov chain, such as using the above-described technique using the stored clickstream data sets. From this Markov chain, the method includes, step 229, calculating a conformance score. From the conformance score, the method further includes, step 230, determining the probability score, which is normalized, step 232.

Thereupon, the probability score for the user session may be compared against other normalized query sessions, such as using the univariate or multivariate comparison models described above, step 234. If the comparison reveals that the probability score is too low compared to the other query sessions, the clickstream is designated as abnormal, step 236. Conversely, if the probability is deemed average or high (or otherwise just not too low), the clickstream may be deemed normal, or at least not-suspicious, step 238. Thereby, through this method of calculating probability scores for clickstreams, suspicious activity may be initially flagged for further security or administrative operations. For example, if the clickstream comparison reveals the user activity to be from a bot, the clickstream data may be discarded for search engine optimization techniques. In another example, suspicious click activity of flagged clickstreams may be ignored when calculating advertising click costs.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computer-implemented method for detecting abnormal user behavior for a query session of an electronic search engine through determining clickstream data by tracking user click activities associated with a search results page generated in response to a user search request including a search term, the method comprising:

electronically determining a conformance score for the clickstream data based on existing clickstream data for one or more similar query sessions, the conformance score representing normal user behavior;

normalizing the conformance score that includes a plurality of tracked user transitions to generate a normalized conformance value based on an event count for the query session;

mapping the clickstream characteristics onto a probability score using univariate or multivariate models; and comparing the probability score with the probability scores for the one or more similar query sessions to determine if the query session is abnormal.

2. The method of claim 1 further comprising:

if the query session has a low probability score relative to the one or more similar query sessions, identifying the query session as abnormal.

3. The method of claim 1 further comprising:

if the query session has a normal or high normalized probability score relative to the one or more similar query sessions, identifying the query session as normal.

4. The method of claim 1 comprising:

determining the conformance score for the clickstream data by comparing the clickstream data against a Markov chain, wherein the Markov chain is generated on the basis of one or more similar query sessions.

5. The method of claim 4 wherein the Markov chain relates to the user click activities for at least one of the web content hyperlinks, page navigation hyperlinks and advertising hyperlinks.

6. The method of claim 1 wherein the step of comparing the normalized probability score includes using at least one of a univariate and multivariate outlier detection model.

7. The method of claim 1, wherein the step of calculating the normalized probability score includes:

determining a normalized vector of events in the clickstream plus the conformance score;

determining a mean vector across the one or more similar query sessions;

determining a covariance matrix for variables in vector; and calculating the probability based on the difference of the product of the covariance matrix and the mean vector from the normalized vector.

8. The method of claim 1 comprising:

if the query session is determined abnormal, conducting further analysis of the clickstream.

* * * * *